US011747973B2

(12) United States Patent
Edwards et al.

(10) Patent No.: US 11,747,973 B2
(45) Date of Patent: Sep. 5, 2023

(54) RULE-BASED USER INTERFACE LAYOUT REARRANGEMENT

(71) Applicant: Capital One Services, LLC, McLean, VA (US)

(72) Inventors: Joshua Edwards, McLean, VA (US); Vu Nguyen, McLean, VA (US); Adam Vukich, McLean, VA (US); Jonatan Yucra Rodriguez, McLean, VA (US); Mykhaylo Bulgakov, McLean, VA (US); Abdelkadar M'Hamed Benkreira, McLean, VA (US); David Gabriele, McLean, VA (US); Ljubica Chatman, McLean, VA (US); Andrea Montealegre, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/662,468

(22) Filed: May 9, 2022

(65) Prior Publication Data

US 2022/0269400 A1 Aug. 25, 2022

Related U.S. Application Data

(63) Continuation of application No. 16/692,066, filed on Nov. 22, 2019, now Pat. No. 11,327,643, which is a
(Continued)

(51) Int. Cl.
*G06F 9/451* (2018.01)
*G06F 3/04847* (2022.01)
*G06F 8/38* (2018.01)

(52) U.S. Cl.
CPC .......... *G06F 3/04847* (2013.01); *G06F 8/38* (2013.01); *G06F 9/451* (2018.02)

(58) Field of Classification Search
CPC ........ G06F 3/04847; G06F 9/451; G06F 8/38; G06F 8/35
See application file for complete search history.

(56) References Cited

U.S. PATENT DOCUMENTS

| 6,785,866 B1 * | 8/2004 | Lewis | G06F 9/451 |
| | | | 725/139 |
| 8,719,451 B1 * | 5/2014 | Colton | G06F 16/958 |
| | | | 709/248 |

(Continued)

OTHER PUBLICATIONS

Amazon., "Amazon Assistant for Chrome," Dec. 8, 2018, pp. 1-2, Retrieved from the Internet: [URL: https://chrome.google.com/webstore/detail/amazon-assistant-for-chro/pbjikboenpfhbbejgkoklgkhjpfogcam].
(Continued)

*Primary Examiner* — Jennifer N Welch
*Assistant Examiner* — K C Chen
(74) *Attorney, Agent, or Firm* — Harrity & Harrity, LLP

(57) ABSTRACT

A device identifies one or more user interface elements, in a user interface, associated with a fixed positioning characteristic and not positioned within another user interface element with the fixed positioning characteristic. The device repositions the one or more user interface elements in the user interface to vacate space for a new user interface element based on a size of the new user interface element and forgo repositioning one or more other user interface elements in the user interface that do not have the fixed positioning characteristic or are positioned within another user interface element with the fixed positioning characteristic. The device inserts the new user interface element into the user interface in a portion of the user interface vacated in connection with repositioning the one or more user
(Continued)

interface elements, and provides the user interface for display based on inserting the new user interface element into the user interface.

20 Claims, 9 Drawing Sheets

Related U.S. Application Data continuation of application No. 16/281,816, filed on Feb. 21, 2019, now Pat. No. 10,489,041.

(56) References Cited

U.S. PATENT DOCUMENTS

| | | |
|---|---|---|
| 10,489,041 B1 | 11/2019 | Edwards |
| 11,327,643 B2 | 5/2022 | Edwards et al. |
| 2006/0212803 A1 | 9/2006 | Arokiaswamy |
| 2006/0218489 A1 | 9/2006 | Ovetchkine et al. |
| 2007/0226613 A1 | 9/2007 | Tandriono et al. |
| 2008/0184159 A1 | 7/2008 | Selig |
| 2008/0282188 A1* | 11/2008 | Hays .................. G06F 8/24 715/788 |
| 2009/0158166 A1 | 6/2009 | Dewar et al. |
| 2009/0199088 A1 | 8/2009 | Haug, III et al. |
| 2009/0228786 A1 | 9/2009 | Danton et al. |
| 2012/0102392 A1 | 4/2012 | Reesman et al. |
| 2012/0254729 A1 | 10/2012 | Wan |
| 2013/0212487 A1 | 8/2013 | Cote |
| 2013/0263280 A1 | 10/2013 | Cote |
| 2014/0028730 A1 | 1/2014 | Abdukalykov et al. |
| 2014/0164992 A1 | 6/2014 | Hogan et al. |
| 2016/0092084 A1 | 3/2016 | Dyar et al. |
| 2016/0342678 A1 | 11/2016 | Newman et al. |
| 2019/0096101 A1* | 3/2019 | De Wever .......... G06F 3/04855 |
| 2019/0114057 A1 | 4/2019 | Kerr |

OTHER PUBLICATIONS

Tiny Technologies Inc.,"Textbox.io Changelog," Jul. 18, 2015, pp. 1-20, Retrieved from the Internet: [URL https://textbox.io/changelog/].

* cited by examiner

RULE-BASED USER INTERFACE LAYOUT REARRANGEMENT

RELATED APPLICATIONS

This application is a continuation of U.S. patent application Ser. No. 16/692,066, filed Nov. 22, 2019 (now U.S. Pat. No. 11,327,643), which is a continuation of U.S. patent application Ser. No. 16/281,816, filed Feb. 21, 2019 (now U.S. Pat. No. 10,489,041), the contents of which are incorporated herein by reference in their entireties.

BACKGROUND

A user interface may include a body with multiple user interface elements arranged to provide information to a user. For example, the body of the user interface may include a first user interface element with a fixed position within the user interface and a second user interface element with a relative position within the user interface. In this case, the first user interface element may be arranged at a center of the user interface based on the fixed position, and the second user interface element may be arranged a particular quantity of pixels away from the first user interface element to avoid overlap. A third user interface element may be associated with a fixed position within the first user interface element. For example, when the first user interface element is a text entry box, the third user interface element may be a button for submitting a text entry entered into the text entry box to a server. User interfaces may be resized and/or rearranged based on an amount of available screen area (e.g., an amount of available pixels). For example, when a user interface size is reduced, complex calculations may be performed to adjust a size of each user interface element in the user interface, to adjust a relative position of each user interface element in the user interface, to ensure that a particular user interface element remains within view in the user interface, and/or the like.

SUMMARY

According to some implementations, a method may include receiving, by a device, a request to alter a layout of a set of user interface elements in a user interface for display on a display to insert a new user interface element into the user interface at a particular location in the user interface. The method may include identifying, by the device, characteristics of the set of user interface elements based on receiving the request to alter the layout, wherein the identifying comprises: identifying, by the device, the set of user interface elements in the user interface; identifying, by the device, a first subset of the set of user interface elements associated with a relative position in the user interface and a second subset of the set of user interface elements associated with a fixed position in the user interface; and identifying, by the device, one or more first user interface elements, from the second subset of the set of user interface elements, that are positioned within a border of one or more second user interface elements of the second subset of the set of user interface elements. The method may include repositioning, by the device, the set of user interface elements based on the characteristics of the set of user interface elements, wherein the repositioning comprises: repositioning, by the device, the one or more second user interface elements by an amount corresponding to a size of the new user interface element; repositioning, by the device, the one or more first user interface elements to remain within the border of the one or more second user interface elements; and repositioning, by the device, the first subset of the set of user interface elements to maintain the relative position in the user interface. The method may include inserting, by the device, the new user interface element into the user interface in a portion of the user interface vacated based on the repositioning of the set of user interface elements, and providing, by the device, the user interface for display based on inserting the new user interface element into the user interface.

According to some implementations, a device may include one or more memories, and one or more processors, communicatively coupled to the one or more memories, to identify one or more user interface elements, in a user interface, associated with a fixed positioning characteristic and not positioned within another user interface element with the fixed positioning characteristic. The one or more processors may reposition the one or more user interface elements in the user interface to vacate space for a new user interface element based on a size of the new user interface element and forgo repositioning one or more other user interface elements in the user interface that do not have the fixed positioning characteristic or are positioned within another user interface element with the fixed positioning characteristic. The one or more processors may insert the new user interface element into the user interface in a portion of the user interface vacated in connection with repositioning the one or more user interface elements, and may provide the user interface for display based on inserting the new user interface element into the user interface.

According to some implementations, a non-transitory computer-readable medium may store instructions that include one or more instructions that, when executed by one or more processors of a device, cause the one or more processors to receive a request to alter a layout of a set of user interface elements in a user interface for display on a display to insert a new user interface element into the user interface at a particular location in the user interface. The one or more instructions may cause the one or more processors to reposition a first user interface element by an amount corresponding to a size of the new user interface element, wherein the first user interface element is associated with a fixed positioning characteristic and is not positioned inside any other user interface element of the user interface. The one or more instructions may cause the one or more processors to reposition a second user interface element to remain within a border of the first user interface element, wherein the second user interface element is associated with a fixed positioning characteristic. The one or more instructions may cause the one or more processors to reposition a third user interface element relative to the first user interface element, wherein the third user interface element is associated with a relative positioning characteristic. The one or more instructions may cause the one or more processors to insert the new user interface element into the user interface in a portion of the user interface vacated in connection with repositioning at least one of the first user interface element, the second user interface element, or the third user interface element. The one or more instructions may cause the one or more processors to provide the user interface for display based on inserting the new user interface element into the user interface.

DETAILED DESCRIPTION

Figure 1A:
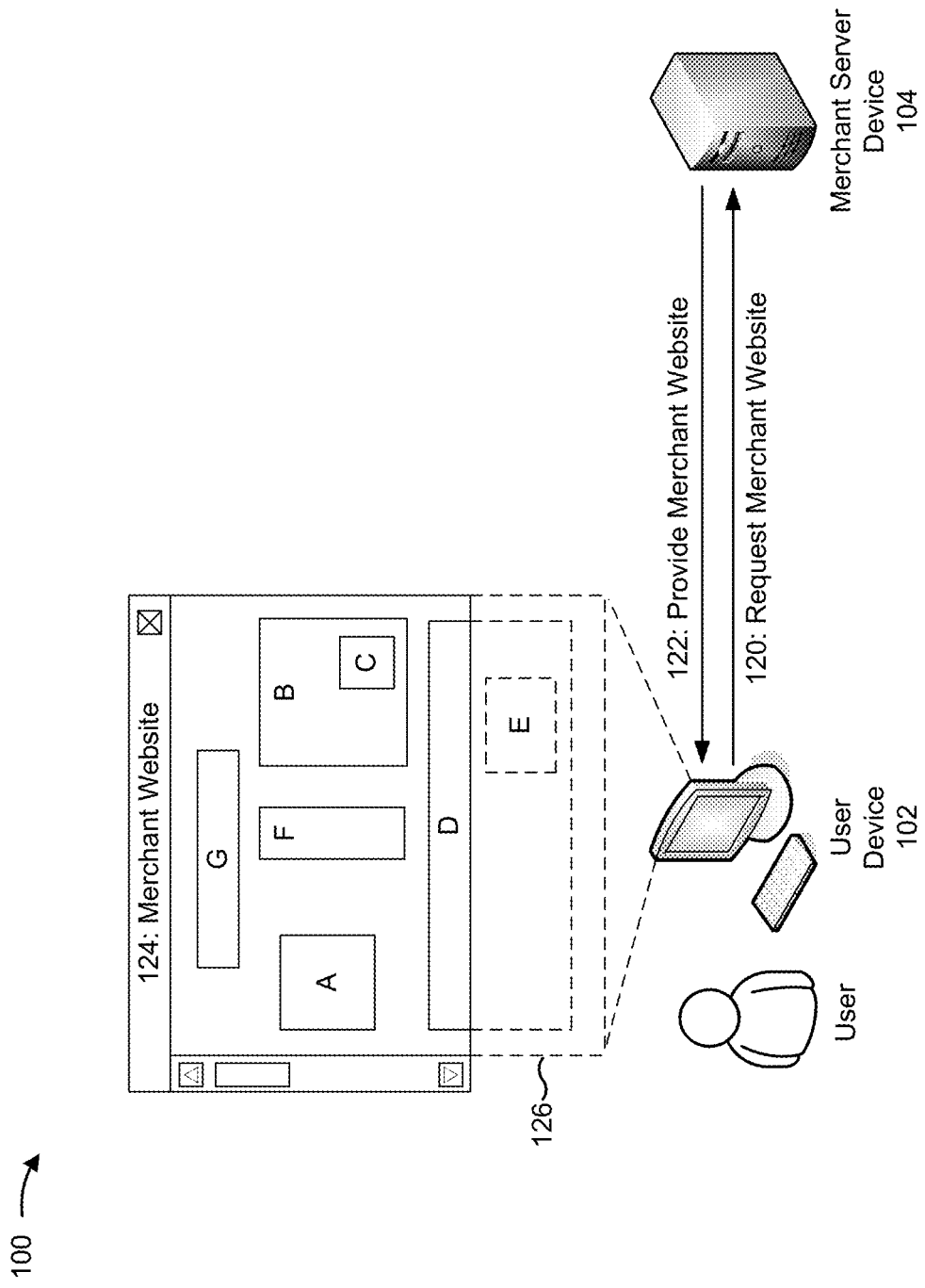
FIGS. 1A-1D are diagrams of an example implementation described herein.

The following detailed description of example implementations refers to the accompanying drawings. The same reference numbers in different drawings may identify the same or similar elements.

When a user interface is resized, a user device may perform a set of complex calculations to rearrange elements in the user interface. For example, the user device may recalculate sizes of user interface elements, recalculate relative positions of user interface elements, and/or the like to determine a layout for the user interface elements in a resized user interface. Such a resizing event may occur, for a user interface of a website provided by a web browser, when a browser extension attempts to provide contextual information relating to the website. For example, a payment extension may provide a drop-down toolbar from a top of a display to provide information relating to payment on a merchant website. In this case, the drop-down toolbar may provide information identifying a payment option, information enabling a user to have payment information automatically provided to a merchant, and/or the like. Additionally, or alternatively, a drop-down toolbar may be provided to enable automatic registration for merchant services. In these cases, the user device may resize a container for the website (e.g., the body of a user interface) to vacate space for the drop-down toolbar. In other words, the user device may resize the user interface of the website to vacate space to insert a new user interface element, which may be the drop-down toolbar.

However, when resizing the user interface, transformation methods used by the user device may result in the user device translating user interface elements by X coordinates or by Y coordinates for an entirety of content in the user interface, which may result in errors in a layout. For example, a user device may perform a translation action to translate each user interface element downward in the user interface by 20 pixels to vacate 20 pixels for a drop-down toolbar. In this case, the user device may translate a first user interface element with a fixed positioning, also termed absolute positioning, in a center of the user interface downward by 20 pixels, which may result in the first user interface element being partially off screen. This may require addition of a scroll bar, may result in additional computing resources being used to scroll the user interface to put the first user interface element in view to a user, and/or the like.

Further, the user device may translate a second user interface element located within the first user interface element (e.g., a button (the second user interface element) for submitting text of a text box (the first user interface element)). In this case, the user device may translate the second user interface element 20 pixels downward as part of a translation action applied to the first user interface element, and then another 20 pixels downward as part of the translation action applied to the second user interface element. This may result in the second user interface element no longer being located within the first user interface element. Further, the user interface element may translate a third user interface element associated with a relative positioning characteristic. In this case, the user device may, as part of a translation action, translate the third user interface element by 20 pixels downward, which may result in whitespace being created in a middle of the user interface, rather than creating desired whitespace at the top of the user interface.

Such errors in user interface transformation may cause information to no longer be visible in a user interface, may cause a crash or an error to be provided when the user device attempts to position a user interface element outside of a user interface, and/or the like. In view of this, the user device may be required to perform complex calculations to determine available whitespace in a user interface, and identify multiple translations to move user interface elements into the available whitespace while vacating an identified portion of the user interface for a new user interface element. Such calculations may waste processing resources to identify the available whitespace, may waste memory resources to store information identifying locations of each user interface element and/or borders thereof, and may result in a time-delay in rendering the user interface for display.

Some implementations described herein use rule-based user interface layout rearrangement to rearrange user interface elements in a user interface to vacate space for inserting a new user interface element. For example, a user device may determine to translate user interface elements that match a pre-defined set of characteristics, such as being associated with fixed positioning and not being located within another user interface element associated with fixed positioning, and may omit other user interface elements from a translation action. Rule-based user interface layout rearrangement based on characteristics of user interface elements may provide standardized user interface layout rearrangement to reduce a quantity of translation actions that are to be performed, thereby avoiding excess calculations relating to available whitespace, avoiding errors in positioning of user interface elements, and/or the like.

FIGS. 1A-1D are diagrams of an example implementation 100 described herein. As shown in FIG. 1A, example implementation 100 includes a user device 102 used by a user and a merchant server device 104. Although some implementations are described in terms of user device 102 performing calculations and/or determinations, another device, such as a cloud computing environment, may perform the calculations and/or determinations, and may provide results of the calculations and/or determinations for display via user device 102. For example, processing of a user interface to inject a new user interface element into the user interface, as described below, may be performed by a layout manager platform, as described below, that determines a layout of a user interface, and provides the user interface for display via a display of user device 102.

As shown in FIG. 1A, and by reference numbers 120 and 122, user device 102 may request and receive a merchant website. For example, user device 102 may receive information identifying a domain name for the merchant website as input (e.g., based on a user interaction with a user interface of user device 102), and may communicate with merchant server device 104 to obtain access to the merchant website. In some implementations, user device 102 may receive program code associated with the merchant website. For example, when user device 102 requests access to the merchant website, user device 102 may receive a document, including code for constructing a user interface for display in a web browser. In this case, user device 102 may execute the code to generate and provide user interface 124 for display to the user.

In some implementations, user device 102 may generate a set of user interface elements for user interface 124. For example, user device 102 may generate and position user interface elements A through G in a body of the user interface. In some implementations, one or more user interface elements may be contained within one or more other user interface elements. For example, as shown, user interface elements C and E may be contained within user interface elements B and D, respectively. In some implementations, one or more user interface elements may be positioned outside of a display area of a display (e.g., in a user interface area 126). For example, as shown, user interface element E may be entirely located in user interface area 126, and user interface element D may be partially located in user interface area 126. In this case, user interface 124 may include a scroll bar to enable a user to scroll user interface 124 to cause user interface elements D and E to be provided in the display area of the display (e.g., and to cause other user interface elements, such as user interface element G) to be moved outside of the display area of the display).

Figure 1B:
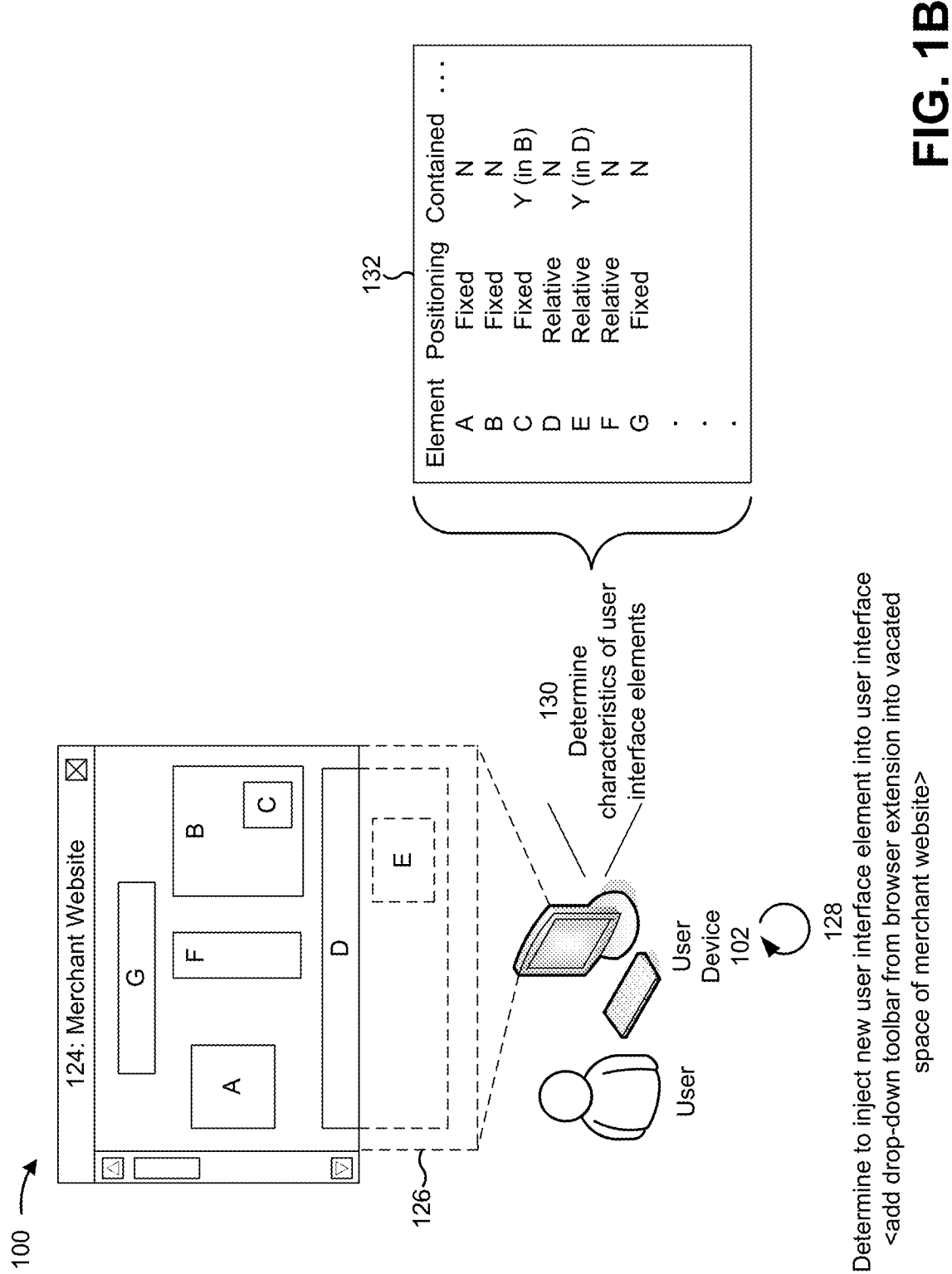

As shown in FIG. 1B, and by reference number 128, user device 102 may determine to inject a new user interface element into a merchant website user interface. For example, user device 102 may determine to vacate space in user interface 124, and insert a drop-down toolbar of a browser extension into user interface 124. In some implementations, user device 102 may determine to inject a new user interface element into user interface 124 based on a triggering event. For example, when a browser extension of a browser providing a merchant website detects that the browser extension can provide payment information relating to the merchant website, user device 102 may determine to vacate space to enable the browser extension to provide information relating to the payment information (e.g., a user prompt, a selection of different payment options, and/or the like). Additionally, or alternatively, user device 102 may detect a user interaction with user interface 124 associated with requesting injection of a new user interface element. For example, user device 102 may detect a resize operation associated with user interface 124, and may determine to vacate space in user interface 124 in accordance with the resize operation and to enable other information to be provided in the vacated space.

As further shown in FIG. 1B, and by reference number 130, user device 102 may determine characteristics 132 of user interface elements of user interface 124. For example, user device 102 may determine a positioning attribute, a containment attribute, and/or the like. In this case, the positioning attribute may include whether a user interface element is associated with a fixed positioning (which may be termed absolute positioning) or with a relative positioning. For example, user device 102 may determine that user interface element A is associated with a fixed positioning and that user interface element D is associated with a relative positioning. Similarly, user device 102 may determine that user interface element A is not contained within a border of another user interface element, and may determine that user interface element C is contained within the border of user interface element B. In some implementations, user device 102 may traverse a document object model (DOM) tree to determine characteristics of the user interface elements. For example, user device 102 may traverse the DOM tree to identify the user interface elements for which to determine characteristics and/or may traverse the DOM tree to determine a characteristic of a user interface element. In this case, user device 102 may determine whether a first user interface element is contained within a second user interface element based on relative positions of the first user interface element and the second user interface element in the DOM tree. Although some implementations are described in terms of a tree, other data structures may be possible.

Figure 1C:
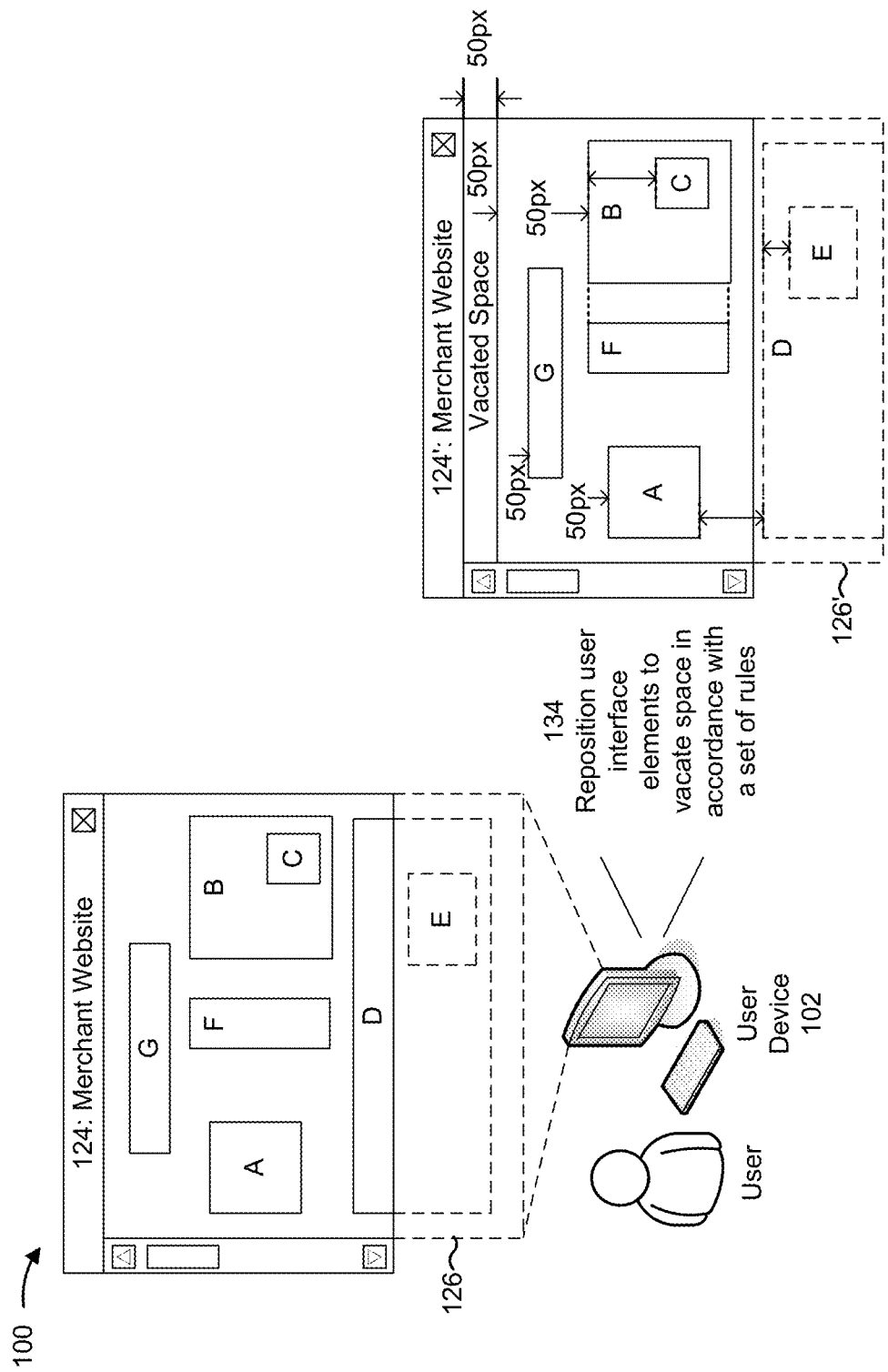

As shown in FIG. 1C, and by reference number 134, user device 102 may reposition user interface elements to vacate space for a new user interface element in accordance with a set of rules. In some implementations, user device 102 may filter the set of user interface elements in accordance with the set of rules. For example, user device 102 may filter the set of user interface elements to determine a subset of user interface elements associated with a fixed positioning type of attribute. In this case, user device 102 may filter the set of user interface elements A-G to identify a subset of user interface elements (A, B, C, and G) associated with the fixed positioning attribute. Additionally, or alternatively, user device 102 may filter the subset of user interface elements to remove user interface elements that are contained within other user interface elements with a fixed position. For example, user device 102 may filter user interface elements A, B, C, and G to identify another subset of user interface elements (e.g., A, B, and G). In this case, user device 102 may apply a translation to a position of the other subset of user interface elements based on a size of the drop-down toolbar that user device 102 is to inject into user interface 124.

In this way, user device 102 may generate an adjusted user interface 124' with an adjusted user interface area 126'. For example, user device 102 may translate user interface elements A, B, and G downward by 50 pixels (px) to vacate 50 pixels of vertical space for a drop-down toolbar. In this case, based on, for example, user interface element B being translated downward 50 pixels, user interface element C is correspondingly translated downward 50 pixels to remain in a same position within user interface element B in user interface 124' as in user interface 124. In this way, by filtering user interface element C from the other subset of user interface elements, user device 102 avoids incorrectly translating user interface element C by another 50 pixels which would result in user interface element C no longer being contained within a border of user interface element B. Similarly, by filtering user interface element F from the other subset of user interface elements, user device 102 may maintain a relative position of user interface element F aligned to user interface element B, rather than translating user interface element F downward resulting in user interface element F losing alignment to user interface element B. Based on omitting some user interface elements from translation, user device 102 vacates space in a user interface without performing complex white space calculations to determine a repositioning of every user interface element. Moreover, user device 102 reduces a likelihood of erroneous layout transformations, such as layout transformations that cause user interface elements to lose relative alignments as described above.

Figure 1D:
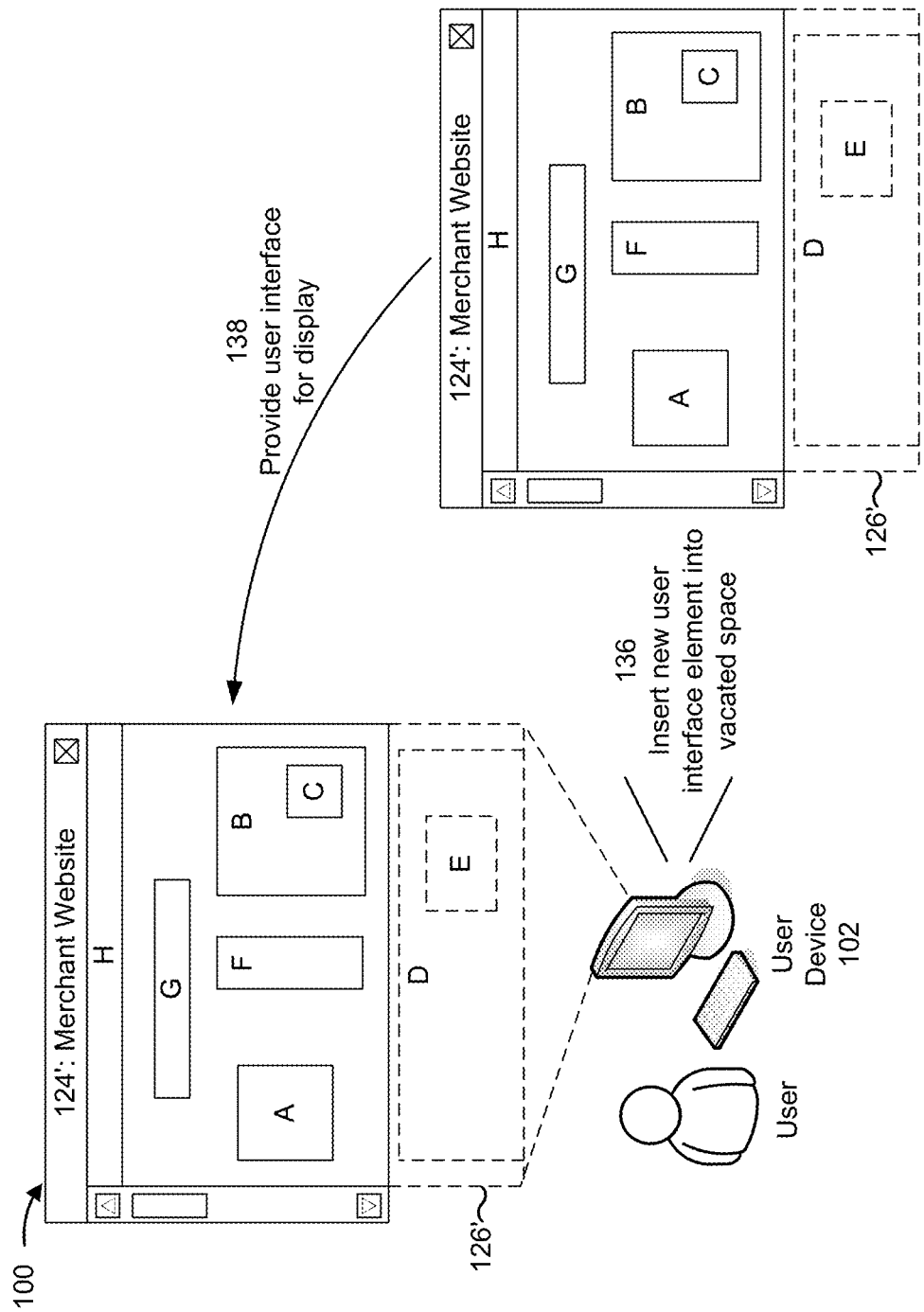

As shown in FIG. 1D, and by reference number 136, user device 102 may insert a new user interface element into the vacated space. For example, based on repositioning some of the user interface elements to vacate space at a top of the user interface, user device 102 may insert user interface element H into the user interface, which may be a drop-down toolbar. Although some implementations are described in terms of a drop-down toolbar and vacating space at a top of a user interface, space may be vacated at a side of a user interface, at a bottom of a user interface, in a middle of a user interface, and/or the like. In some implementations, user device 102 may assign one or more attributes and/or characteristics to the new user interface element. For example, user device 102 may set the new user interface element as a relative positioning user interface element (e.g., positioned relative to a top of the user interface, such that the new user interface element remains at the top of a display when the user interface is scrolled). In some implementations, user device 102 may select a particular version of the new user interface element. For example, user device 102 may select a version of the new user interface element, from multiple versions of the new user interface element with multiple sizes, associated with a size that has been vacated in user interface 124. Additionally, or alternatively, user device 102 may determine the amount of space to vacate based on a size of an available version of the new user interface element.

As further shown in FIG. 1D, and by reference number 138, user device 102 may provide user interface 124' for display. For example, user device 102 may provide the merchant website for display with the drop-down toolbar injected into user interface 124'. In some implementations, user device 102 may subsequently remove or resize the new user interface element. For example, user device 102 may re-identify user interface elements associated with a fixed positioning and not located within other fixed positioning user interface elements, and may translate the re-identified user interface elements to remove vacated space or resize vacated space. In some implementations, user device 102 may remove child user interface elements of the new user interface element. For example, when user device 102 injects one or more child user interface elements (e.g., user interface elements within a border of the new user interface element), user device 102 may remove the one or more child user interface elements when removing the new user interface element. Additionally, or alternatively, user device 102 may reattach the one or more child user interface elements to a parent user interface element of the new user interface element. For example, when the new user interface element is in a body of user interface 124', user device 102 may attach the one or more child user interface elements to the body of user interface 124'. Additionally, or alternatively, when the new user interface element is within another user interface element (e.g., a box added into user interface element A), user device 102 may reattach child user interface elements of the new user interface element into the other user interface element (e.g., attaching the child user interface elements as contained within user interface element A when the new user interface element is removed).

In some implementations, user device 102 may avoid re-identifying user interface elements by using a cache. For example, user device 102 may store, in a cache, information identifying which user interface elements were translated to vacate space, and may reverse a translation applied to the user interface elements identified in the cache. In this way, user device 102 avoids recalculation of user interface element characteristics, avoids complex layout reorganization calculations described above, and/or the like. In some implementations, user device 102 may monitor a document object model (DOM). For example, user device 102 may monitor the DOM to identify any changes to user interface elements in user interface 124, and may use information regarding the changes to user interface elements when removing the new user interface element (e.g., by updating information stored in the cache). Additionally, or alternatively, user device 102 may alter a position of one or more user interface elements based on detecting a change to the DOM, such as by selectively translating one or more of the user interface elements.

As indicated above, FIGS. 1A-1D are provided merely as an example. Other examples may differ from what was described with regard to FIGS. 1A-1D.

Figure 2:
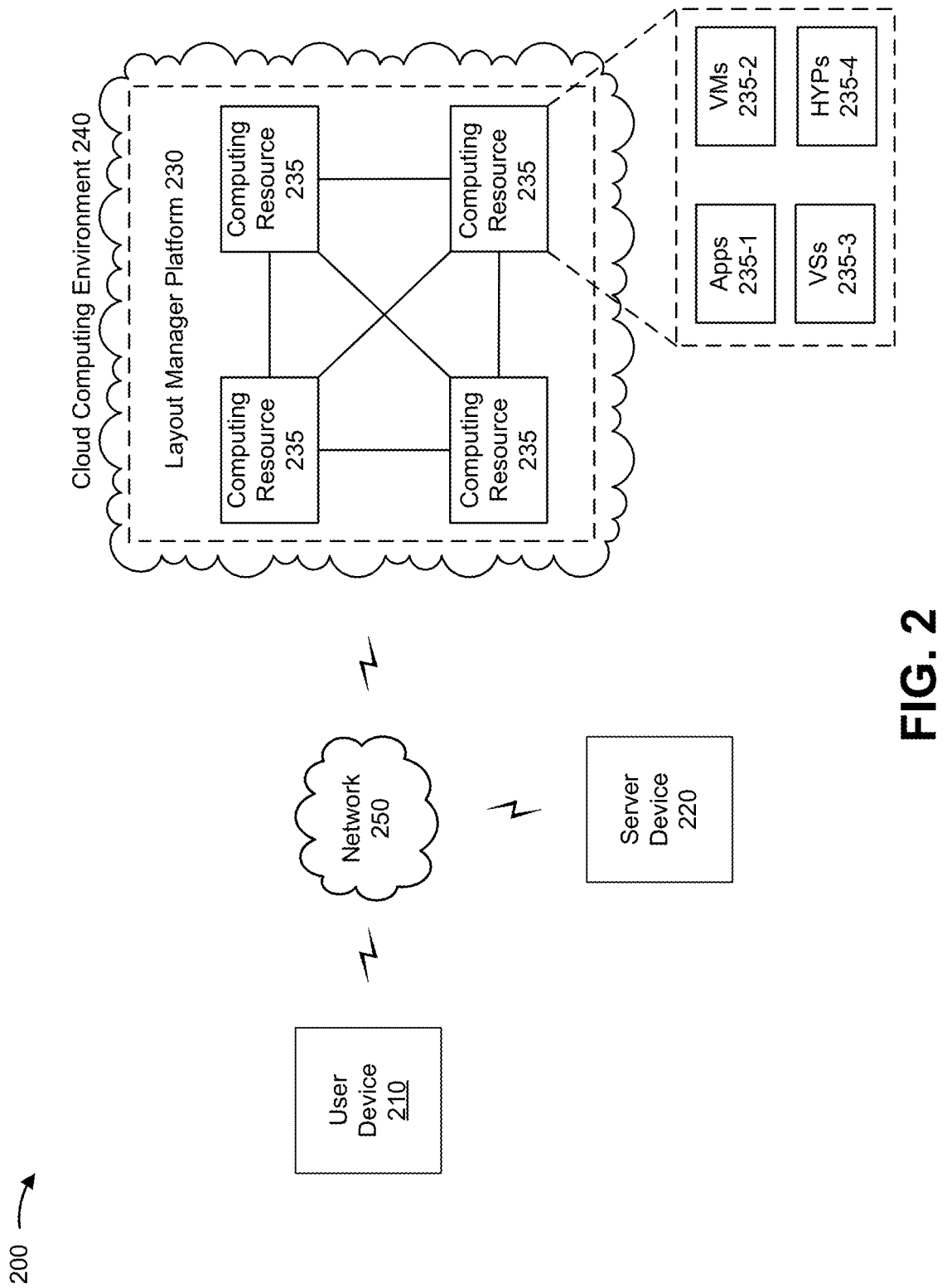
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, a layout manager platform 230, a computing resource 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with providing a user interface. For example, user device 210 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device.

Server device 220 includes one or more devices capable of storing, processing, and/or routing information associated with providing a website. For example, server device 220 may be a merchant website server, a data server, and/or the like. In some implementations, server device 220 may include a communication interface that allows server device 220 to receive information from and/or transmit information to other devices in environment 200.

Layout manager platform 230 includes one or more computing resources assigned to manage a layout of a website. For example, layout manager platform 230 may be a platform implemented by cloud computing environment 240 that may perform calculations relating to rearranging positions of user interface elements in a user interface provided to user device 210 for display. In some implementations, layout manager platform 230 is implemented by computing resources 235 of cloud computing environment 240.

Layout manager platform 230 may include a server device or a group of server devices. In some implementations, layout manager platform 230 may be hosted in cloud computing environment 240. Notably, while implementations described herein describe layout manager platform 230 as being hosted in cloud computing environment 240, in some implementations, layout manager platform 230 may be non-cloud-based or may be partially cloud-based.

Cloud computing environment 240 includes an environment that delivers computing as a service, whereby shared resources, services, etc. may be provided to manage a layout of user interface elements in a user interface. Cloud computing environment 240 may provide computation, software, data access, storage, and/or other services that do not require end-user knowledge of a physical location and configuration of a system and/or a device that delivers the services. As shown, cloud computing environment 240 may include layout manager platform 230 and computing resource 235.

Computing resource 235 includes one or more personal computers, workstation computers, server devices, or another type of computation and/or communication device. In some implementations, computing resource 235 may host layout manager platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with layout manager platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
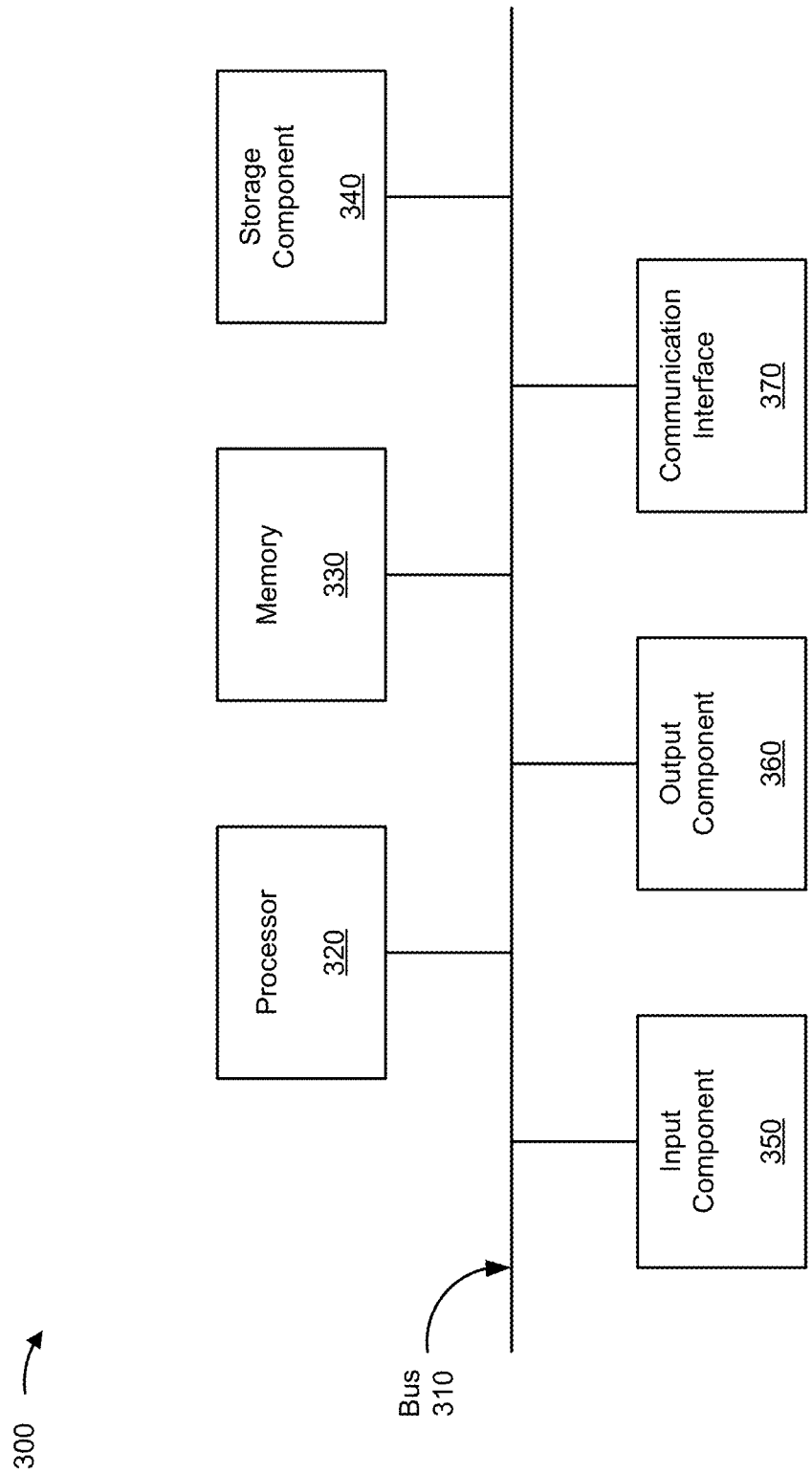
FIG. 3 is a diagram of example components of one or more devices of FIG. 2.

FIG. 3 is a diagram of example components of a device 300. Device 300 may correspond to user device 210, server device 220, layout manager platform 230, and/or computing resource 235. In some implementations, user device 210, server device 220, layout manager platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device 300. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
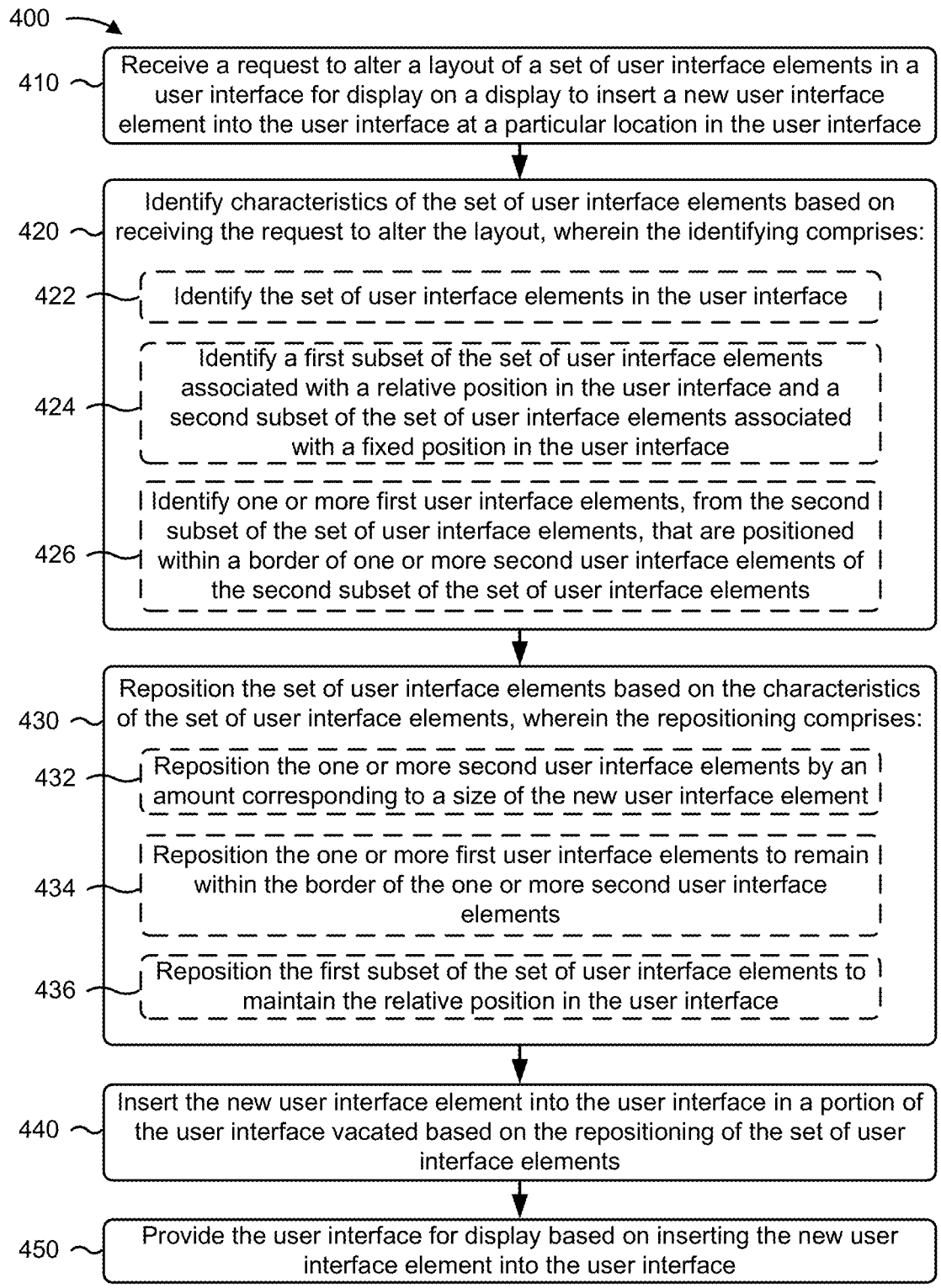
FIG. 4 is a flow chart of an example process for rule-based user interface layout rearrangement.

FIG. 4 is a flow chart of an example process 400 for rule-based user interface layout rearrangement. In some implementations, one or more process blocks of FIG. 4 may be performed by a layout manager platform (e.g., layout manager platform 230). In some implementations, one or more process blocks of FIG. 4 may be performed by another device or a group of devices separate from or including a layout manager platform (e.g., layout manager platform 230), such as a user device (e.g., user device 210), a server device (e.g., server device 220), and a computing resource (e.g., computing resource 235). For example, a user device may perform one or more process blocks of FIG. 4 without a layout manager platform, or may receive results of one or more process blocks of FIG. 4 being performed by the layout manager platform (e.g., an altered user interface layout), and may provide the results for display.

As shown in FIG. 4, process 400 may include receiving a request to alter a layout of a set of user interface elements in a user interface for display on a display to insert a new user interface element into the user interface at a particular location in the user interface (block 410). For example, the layout manager platform (e.g., using processor 320, memory 330, storage component 340, input component 350, and communication interface 370, and/or the like) may receive a request to alter a layout of a set of user interface elements in a user interface for display on a display to insert a new user interface element into the user interface at a particular location in the user interface, as described above.

As further shown in FIG. 4, process 400 may include identifying characteristics of the set of user interface elements based on receiving the request to alter the layout (block 420). For example, the layout manager platform (e.g., using processor 320, memory 330, storage component 340, input component 350, and communication interface 370, and/or the like) may identify characteristics of the set of user interface elements based on receiving the request to alter the layout, as described above.

As further shown in FIG. 4, process 400 and block 420 may include identifying the set of user interface elements in the user interface (block 422). For example, the layout manager platform (e.g., using processor 320, memory 330, storage component 340, and/or the like) may identify the set of user interface elements in the user interface, as described above.

As further shown in FIG. 4, process 400 and block 420 may include identifying a first subset of the set of user interface elements associated with a relative position in the user interface and a second subset of the set of user interface elements associated with a fixed position in the user interface (block 424). For example, the layout manager platform (e.g., using processor 320, memory 330, storage component 340, and/or the like) may identify a first subset of the set of user interface elements associated with a relative position in the user interface and a second subset of the set of user interface elements associated with a fixed position in the user interface, as described above.

As further shown in FIG. 4, process 400 and block 420 may include identifying one or more first user interface elements, from the second subset of the set of user interface elements, that are positioned within a border of one or more second user interface elements of the second subset of the set of user interface elements (block 426). For example, the layout manager platform (e.g., using processor 320, memory 330, storage component 340, and/or the like) may identify one or more first user interface elements, from the second subset of the set of user interface elements, that are positioned within a border of one or more second user interface elements of the second subset of the set of user interface elements, as described above.

As further shown in FIG. 4, process 400 may include repositioning the set of user interface elements based on the characteristics of the set of user interface elements (block 430). For example, the layout manager platform (e.g., using processor 320, memory 330, storage component 340, and/or the like) may reposition the set of user interface elements based on the characteristics of the set of user interface elements, as described above.

As further shown in FIG. 4, process 400 and block 430 may include repositioning the one or more second user interface elements by an amount corresponding to a size of the new user interface element (block 432). For example, the layout manager platform (e.g., using processor 320, memory 330, storage component 340, and/or the like) may reposition the one or more second user interface elements by an amount corresponding to a size of the new user interface element, as described above.

As further shown in FIG. 4, process 400 and block 430 may include repositioning the one or more first user interface elements to remain within the border of the one or more second user interface elements (block 434). For example, the layout manager platform (e.g., using processor 320, memory 330, storage component 340, and/or the like) may reposition the one or more first user interface elements to remain within the border of the one or more second user interface elements, as described above.

As further shown in FIG. 4, process 400 and block 430 may include repositioning the first subset of the set of user interface elements to maintain the relative position in the user interface (block 436). For example, the layout manager platform (e.g., using processor 320, memory 330, storage component 340, and/or the like) may reposition the first subset of the set of user interface elements to maintain the relative position in the user interface, as described above.

As further shown in FIG. 4, process 400 may include inserting the new user interface element into the user interface in a portion of the user interface vacated based on the repositioning of the set of user interface elements (block 440). For example, the layout manager platform (e.g., using processor 320, memory 330, and/or the like) may insert the new user interface element into the user interface in a portion of the user interface vacated based on the repositioning of the set of user interface elements, as described above.

As further shown in FIG. 4, process 400 may include providing the user interface for display based on inserting the new user interface element into the user interface (block 450). For example, the layout manager platform (e.g., using processor 320, memory 330, storage component 340, output component 360, and communication interface 370, and/or the like) may provide the user interface for display based on inserting the new user interface element into the user interface, as described above.

Process 400 may include additional aspects, such as any single aspect or any combination of aspects described below and/or in connection with one or more other processes described elsewhere herein.

In some implementations, the layout manager platform may cache the characteristics of the set of user interface elements. In some implementations, the layout manager platform may receive another request to resize or reposition the new user interface element, and may use cached information regarding the characteristics of the set of user interface elements to alter the layout to resize or reposition the new user interface element.

In some implementations, the layout manager platform may receive another request to remove the new user interface element from the user interface, and may use cached information regarding the characteristics of the set of user interface elements to alter the layout to remove the new user interface element from the user interface. In some implementations, the layout manager platform may receive another request to remove the new user interface element from the user interface, and may reposition the set of user interface elements based on the characteristics of the set of user interface elements and a characteristic of the new user interface element as a response to receive the other request.

In some implementations, the layout manager platform may monitor a document object model (DOM) associated with altering the set of user interface elements, may detect an alteration to the DOM based on monitoring the DOM, and may alter the layout based on detecting the alteration to the DOM. In some implementations, the new user interface element may be an information bar, that is positioned at a top of the user interface, a bottom of the user interface, a left side of the user interface, or a right side of the user interface.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
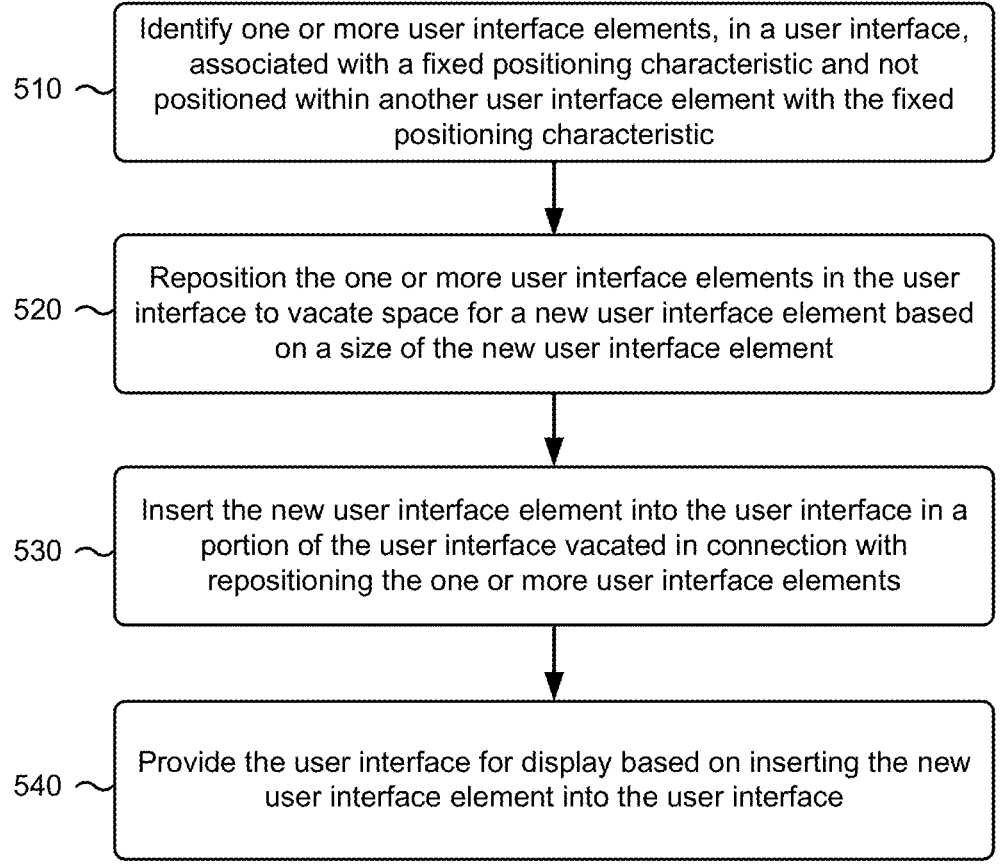
FIG. 5 is a flow chart of an example process for rule-based user interface layout rearrangement.

FIG. 5 is a flow chart of an example process 500 for rule-based user interface layout rearrangement. In some implementations, one or more process blocks of FIG. 5 may be performed by a layout manager platform (e.g., layout manager platform 230). In some implementations, one or more process blocks of FIG. 5 may be performed by another device or a group of devices separate from or including a layout manager platform (e.g., layout manager platform 230), such as a user device (e.g., user device 210), a server device (e.g., server device 220), and a computing resource (e.g., computing resource 235). For example, a user device may perform one or more process blocks of FIG. 5 without a layout manager platform, or may receive results of one or more process blocks of FIG. 5 being performed by the layout manager platform (e.g., an altered user interface layout), and may provide the results for display.

As shown in FIG. 5, process 500 may include identifying one or more user interface elements, in a user interface, associated with a fixed positioning characteristic and not positioned within another user interface element with the fixed positioning characteristic (block 510). For example, the layout manager platform (e.g., using processor 320, memory 330, storage component 340, input component 350, and communication interface 370, and/or the like) may identify one or more user interface elements, in a user interface, associated with a fixed positioning characteristic and not positioned within another user interface element with the fixed positioning characteristic, as described above.

As further shown in FIG. 5, process 500 may include repositioning the one or more user interface elements in the user interface to vacate space for a new user interface element based on a size of the new user interface element (block 520). For example, the layout manager platform (e.g., using processor 320, memory 330, storage component 340, input component 350, and communication interface 370, and/or the like) may reposition the one or more user interface elements in the user interface to vacate space for a new user interface element based on a size of the new user interface element, as described above.

As further shown in FIG. 5, process 500 may include inserting the new user interface element into the user interface in a portion of the user interface vacated in connection with repositioning the one or more user interface elements (block 530). For example, the layout manager platform (e.g., using processor 320, memory 330, storage component 340, input component 350, and communication interface 370, and/or the like) may insert the new user interface element into the user interface in a portion of the user interface vacated in connection with repositioning the one or more user interface elements, as described above.

As further shown in FIG. 5, process 500 may include providing the user interface for display based on inserting the new user interface element into the user interface (block 540). For example, the layout manager platform (e.g., using processor 320, memory 330, storage component 340, output component 360, and communication interface 370, and/or the like) may provide the user interface for display based on inserting the new user interface element into the user interface, as described above.

Process 500 may include additional aspects, such as any single aspect or any combination of aspects described below and/or in connection with one or more other processes described elsewhere herein.

In some implementations, the layout manager platform may reposition a first user interface element, located within a border of a second user interface element, such that the first user interface element remains located within the border of the second user interface element. In some implementations, the layout manager platform may select, based on an initial layout of the user interface, the new user interface element from a plurality of candidate new user interface elements, where the new user interface element is sized based on an availability of space in the initial layout of the user interface, and, when inserting the new user interface element, the layout manager platform may insert the new user interface element based on selecting the new user interface element.

In some implementations, the layout manager platform may reposition a particular user interface element with a fixed positioning characteristic, visible in an initial layout on a display, such that the particular user interface element remains visible in a subsequent layout on the display after inserting the new user interface element. In some implementations, the layout manager platform may reposition a particular user interface element with a relative positioning characteristic, completely visible in an initial layout on a display, such that the particular user interface element is at least partially hidden in a subsequent layout on the display after inserting the new user interface element.

In some implementations, the layout manager platform may traverse a document object model (DOM) tree to select the one or more user interface elements from a plurality of user interface elements of the user interface, and, when repositioning the one or more user interface elements, the layout manager platform may reposition the one or more user interface elements based on traversing the DOM tree. In some implementations, the layout manager platform may maintain a position of the new user interface element in the user interface when the user interface is moved.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
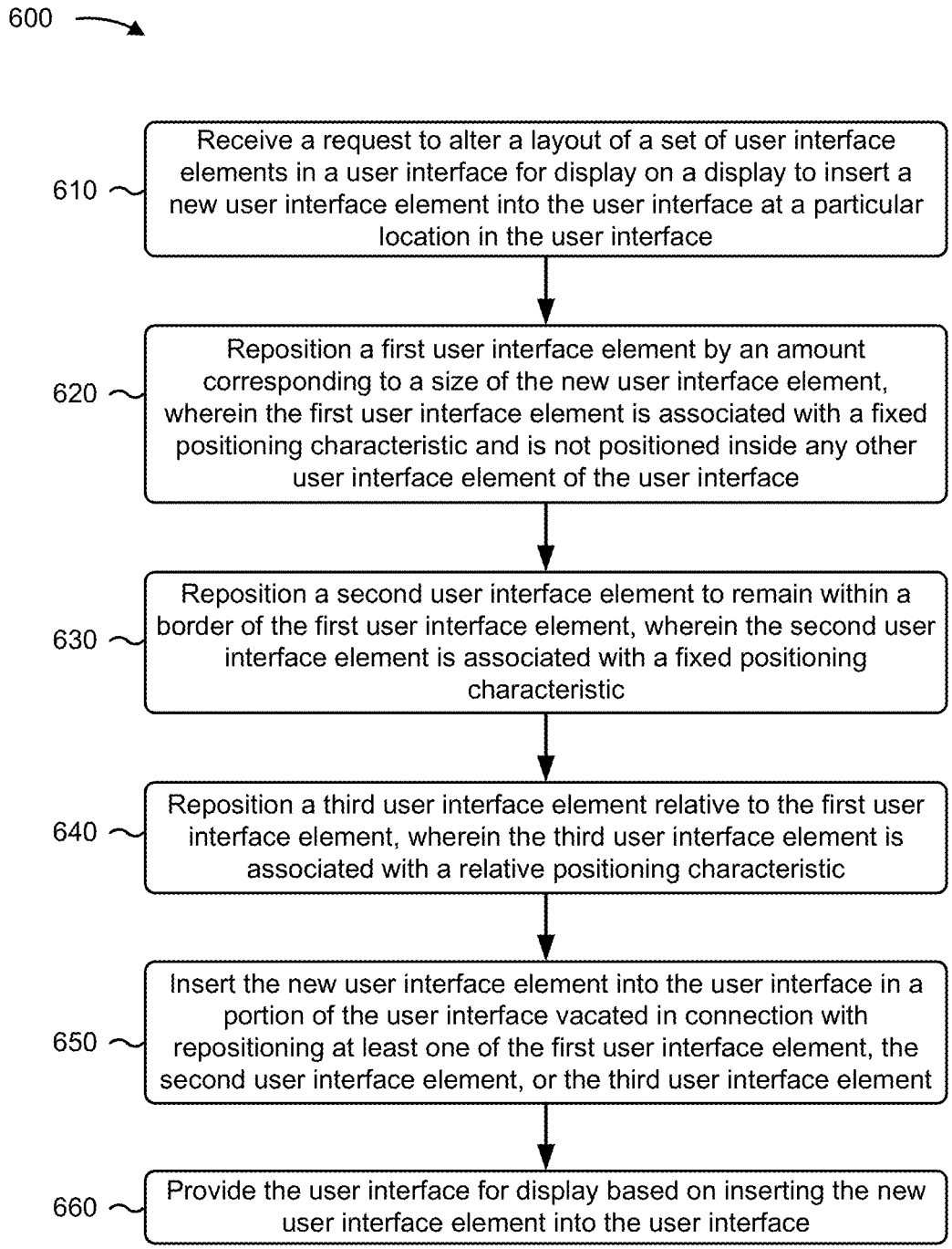
FIG. 6 is a flow chart of an example process for rule-based user interface layout rearrangement.

FIG. 6 is a flow chart of an example process 600 for rule-based user interface layout rearrangement. In some implementations, one or more process blocks of FIG. 6 may be performed by a layout manager platform (e.g., layout manager platform 230). In some implementations, one or more process blocks of FIG. 6 may be performed by another device or a group of devices separate from or including a layout manager platform (e.g., layout manager platform 230), such as a user device (e.g., user device 210), a server device (e.g., server device 220), and a computing resource (e.g., computing resource 235).

As shown in FIG. 6, process 600 may include receiving a request to alter a layout of a set of user interface elements in a user interface for display on a display to insert a new user interface element into the user interface at a particular location in the user interface (block 610). For example, the layout manager platform (e.g., using processor 320, memory 330, storage component 340, input component 350, and communication interface 370, and/or the like) may receive a request to alter a layout of a set of user interface elements in a user interface for display on a display to insert a new user interface element into the user interface at a particular location in the user interface, as described above.

As further shown in FIG. 6, process 600 may include repositioning a first user interface element by an amount corresponding to a size of the new user interface element, wherein the first user interface element is associated with a fixed positioning characteristic and is not positioned inside any other user interface element of the user interface (block 620). For example, the layout manager platform (e.g., using processor 320, memory 330, storage component 340, input component 350, and communication interface 370, and/or the like) may reposition a first user interface element by an amount corresponding to a size of the new user interface element, as described above. In some implementations, the first user interface element is associated with a fixed positioning characteristic and is not positioned inside any other user interface element of the user interface.

As further shown in FIG. 6, process 600 may include repositioning a second user interface element to remain within a border of the first user interface element, wherein the second user interface element is associated with a fixed positioning characteristic (block 630). For example, the layout manager platform (e.g., using processor 320, memory 330, storage component 340, input component 350, and communication interface 370, and/or the like) may reposition a second user interface element to remain within a border of the first user interface element, as described above. In some implementations, the second user interface element is associated with a fixed positioning characteristic.

As further shown in FIG. 6, process 600 may include repositioning a third user interface element relative to the first user interface element, wherein the third user interface element is associated with a relative positioning characteristic (block 640). For example, the layout manager platform (e.g., using processor 320, memory 330, storage component 340, input component 350, and communication interface 370, and/or the like) may reposition a third user interface element relative to the first user interface element, as described above. In some implementations, the third user interface element is associated with a relative positioning characteristic.

As further shown in FIG. 6, process 600 may include inserting the new user interface element into the user interface in a portion of the user interface vacated in connection with repositioning at least one of the first user interface element, the second user interface element, or the third user interface element (block 650). For example, the layout manager platform (e.g., using processor 320, memory 330, storage component 340, input component 350, and communication interface 370, and/or the like) may insert the new user interface element into the user interface in a portion of the user interface vacated in connection with repositioning at least one of the first user interface element, the second user interface element, or the third user interface element, as described above.

As further shown in FIG. 6, process 600 may include providing the user interface for display based on inserting the new user interface element into the user interface (block 660). For example, the layout manager platform (e.g., using processor 320, memory 330, storage component 340, output component 360, and communication interface 370, and/or the like) may provide the user interface for display based on inserting the new user interface element into the user interface, as described above.

Process 600 may include additional aspects, such as any single aspect or any combination of aspects described below and/or in connection with one or more other processes described elsewhere herein.

In some implementations, the layout manager platform may store information identifying alterations to the user interface to reposition the first user interface element, the second user interface element, and the third user interface element, may remove the new user interface element from the user interface, and may restore the layout of the new user interface based on the information identifying the alterations to the user interface.

In some implementations, the new user interface element may be populated with information from a browser extension. In some implementations, the user interface may be a browser. In some implementations, at least one user interface element, of the user interface, may be not moved in the user interface by an amount corresponding to a size of the new user interface element. In some implementations, the new user interface element may be injected into the user interface.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
repositioning, by a device and based on receiving data identifying a new user interface element and using a rule-based user interface layout rearrangement, a set of user interface elements associated with a user interface, wherein the repositioning includes:
repositioning a first user interface element, of the set of user interface elements, by an amount associated with a dimension of the new user interface element,
repositioning, based on repositioning the first user interface element and using the rule-based user interface layout rearrangement, a second user interface element, of the set of user interface elements, relative to the first user interface element based on a relative positioning characteristic associated with the second user interface element,
wherein the second user interface element is located outside a border of the first user interface element,
filtering the set of user interface elements to determine a first subset of user interface elements associated with a fixed positioning type of attribute,
removing user interface elements contained within other user interface elements with a fixed position from the first subset of user interface elements to identify a second subset of user interface elements, and
applying a translation to a position associated with the second subset of user interface elements; and
inserting, by the device, the new user interface element into the user interface in a portion of the user interface vacated based on the repositioning of the set of user interface elements.

2. The method of claim 1, further comprising:
determining the relative positioning characteristic based on traversing a document object model (DOM) tree.

3. The method of claim 1, further comprising:
setting the new user interface element as a relative positioning element.

4. The method of claim 1, further comprising:
monitoring a document object model (DOM) associated with altering the set of user interface elements; and
repositioning the set of user interface elements based on detecting an alteration to the DOM.

5. The method of claim 1, further comprising:
translating one or more user interface elements, of the set of user interface elements, to vacate space in the user interface; and
storing information identifying which of the one or more user interface elements was translated.

6. The method of claim 1, wherein the data identifying a new user interface element is associated with a browser extension.

7. The method of claim 1, wherein the applying the translation comprises:

applying the translation based on a size of the new user interface element.

8. A device, comprising:
one or more memories; and
one or more processors, coupled to the one or more memories, configured to:
reposition, based on receiving data identifying a new user interface element and using a rule-based user interface layout rearrangement, a set of user interface elements associated with a user interface,
wherein the one or more processors, to reposition the set of user interface elements, are configured to:
reposition a first user interface element, of the set of user interface elements, by an amount associated with a dimension of the new user interface element, and
reposition, based on repositioning the first user interface element and using the rule-based user interface layout rearrangement, a second user interface element, of the set of user interface elements, relative to the first user interface element based on a relative positioning characteristic associated with the second user interface element,
wherein the second user interface element is located outside a border of the first user interface element,
filter the set of user interface elements to determine a first subset of user interface elements associated with a fixed positioning type of attribute,
remove user interface elements contained within other user interface elements with a fixed position from the first subset of user interface elements to identify a second subset of user interface elements, and
apply a translation to a position associated with the second subset of user interface elements; and
insert the new user interface element into the user interface in a portion of the user interface vacated based on the repositioning of the set of user interface elements.

9. The device of claim 8, wherein the one or more processors are further configured to:
determine the relative positioning characteristic based on traversing a document object model (DOM) tree.

10. The device of claim 8, wherein the one or more processors are further configured to:
set the new user interface element as a relative positioning element.

11. The device of claim 8, wherein the one or more processors are further configured to:
monitor a document object model (DOM) associated with altering the set of user interface elements; and
reposition the set of user interface elements based on detecting an alteration to the DOM.

12. The device of claim 8, wherein the one or more processors are further configured to:
translate one or more user interface elements, of the set of user interface elements, to vacate space in the user interface; and
store information identifying which of the one or more user interface elements was translated.

13. The device of claim 8, wherein the data identifying a new user interface element is associated with a browser extension.

14. The device of claim 8, wherein the one or more processors are further configured to:
assign one or more positioning attributes to the new user interface element.

15. A non-transitory computer-readable medium storing a set of instructions, the set of instructions comprising:
one or more instructions that, when executed by one or more processors of a device, cause the device to:
reposition, based on receiving data identifying a new user interface element and using a rule-based user interface layout rearrangement, a set of user interface elements associated with a user interface,
wherein the one or more instructions, that cause the one or more processors to reposition the set of user interface elements, cause the one or more processors to:
reposition a first user interface element, of the set of user interface elements, by an amount associated with a dimension of the new user interface element, and
reposition, based on repositioning the first user interface element and using the rule-based user interface layout rearrangement, a second user interface element, of the set of user interface elements, relative to the first user interface element based on a relative positioning characteristic associated with the second user interface element,
wherein the second user interface element is located outside a border of the first user interface element,
filter the set of user interface elements to determine a first subset of user interface elements associated with a fixed positioning type of attribute,
remove user interface elements contained within other user interface elements with a fixed position from the first subset of user interface elements to identify a second subset of user interface elements, and
apply a translation to a position associated with the second subset of user interface elements; and
insert the new user interface element into the user interface in a portion of the user interface vacated based on the repositioning of the set of user interface elements.

16. The non-transitory computer-readable medium of claim 15, wherein the one or more instructions further cause the device to:
determine the relative positioning characteristic based on traversing a document object model (DOM) tree.

17. The non-transitory computer-readable medium of claim 15, wherein the one or more instructions further cause the device to:
set the new user interface element as a relative positioning element.

18. The non-transitory computer-readable medium of claim 15, wherein the one or more instructions further cause the device to:
monitor a document object model (DOM) associated with altering the set of user interface elements; and
reposition the set of user interface elements based on detecting an alteration to the DOM.

19. The non-transitory computer-readable medium of claim 15, wherein the one or more instructions further cause the device to:
translate one or more user interface elements, of the set of user interface elements, to vacate space in the user interface; and
store information identifying which of the one or more user interface elements was translated.

20. The non-transitory computer-readable medium of claim 15, wherein the one or more instructions further cause the device to:

select a particular version of the new user interface element.

\* \* \* \* \*